United States Patent Office 2,852,573
Patented Sept. 16, 1958

2,852,573

1,1-DIFLUORO-2,2-DIMETHYLETHYLENE AND ITS PREPARATION

Elkan R. Blout, Belmont, Saul G. Cohen, Lexington, Richard S. Corley, Wellesley Hills, and Myron S. Simon, Waltham, Mass., assignors to Polaroid Corporation, Cambridge, Mass., a corporation of Delaware No Drawing. Application December 23, 1953
Serial No. 400,106

3 Claims. (Cl. 260—653)

The object of this invention is to provide, as a novel composition of matter, 1,1-difluoro-2,2-dimethylethylene, $CF_2=C(CH_3)_2$, and more particularly, to provide its monomer, a useful polymerizable compound, its preparation, and intermediates useful in its preparation.

This monomer may be prepared, for example, by (1) hydrogenolysis with rearrangement of 1,1-difluoro-1-chloro-2-methyl-propene-2, $CF_2ClC(CH_3)=CH_2$, (2) lithium aluminum hydride reduction with rearrangement of this olefin, or (3) reaction of zinc with phosphite esters of the type $(CF_2ClC(O)(CH_3)_2)_nPBr_{3-n}$, where $n=1-3$. The monomer boils at approximately 13° C., is stable in air, and is practically odorless. The monomer polymerizes when heated at about 80° C. in the presence of benzoyl peroxide.

The preparation of 1,1-difluoro-2,2-dimethylethylene is specifically illustrated in the following nonlimiting examples:

Example I

Difluorochloromethyl dimethyl carbinol, $$CF_2ClC(OH)(CH_3)_2$$

was prepared as a first intermediate in a single step by the following reaction:

$$CF_2ClCOONa \longrightarrow CF_2ClCOCl \xrightarrow{2CH_3MgBr} CF_2ClC(OH)(CH_3)_2$$

The apparatus for the reaction included a 1 liter three-necked flask fitted with a stirrer, a solids addition funnel, and a Friedrichs condenser, connected at the outlet to a gas inlet leading below the surface of the solution in a 3 liter three-necked flask fitted with a stirrer and Dry Ice condenser. To 230 g. (1.5 m.) of phosphorus oxychloride, $POCl_3$, in the first flask was added, through the solids addition funnel, 152.5 g. (1.0 m.) of sodium difluorochloroacetate, $CF_2ClCOONa$. In the second flask, which was cooled in an ice bath, was placed 700 cc. of a 4 N Grignard solution of methyl magnesium bromide, and 350 cc. of absolute ether. The first flask was heated to about 100° C. so that reflux of excess phosphorus oxychloride and transfer of the resulting difluorochloroacetyl chloride, $CF_2ClCOCl$, to the second flask occurred. Then a saturated solution of ammonium chloride was added drop-by-drop to the Grignard solution until a white solid mass formed. To the solution remaining after removal of this mass was added petroleum ether in order to azeotropically remove water. The solution, fractionated through a high efficiency column, yielded 113.5 g. of the carbinol at a constant temperature of 106.5° C. at 750 mm.

The olefin, 1,1-difluoro-1-chloro-2-methyl-propene-2, $CF_2Cl(CH_3)=CH_2$, was prepared as a second intermediate by reacting 256 g. (1.23 m.) of phosphorus pentachloride with 108 g. (0.75 m.) of the carbinol, prepared as above. The reaction product, fractionated through a high efficiency column, yielded 77.0 g. of the olefin at a temperature of 46° C. at 760 mm.

From this olefin, 1,1-difluoro-2,2-dimethylethylene was prepared as follows: 25 g. of the olefin was treated at 100° C. to 200° C. with Raney nickel in 200 ml. of ethanol under hydrogen at a pressure of 1600 pounds per square inch for 12 hours. About 40% of the stoichiometrical quantity of hydrogen reacted. Rectification of 8 g. of the low boiling reaction product (B. P. 26° C.–30° C.) gave products at two temperature plateaus, a 2.1 g. product at 9.5° C.–10.2° C. and a 0.6 g. product at 29.0° C.–30.7° C. The first product, apparently a mixture of ethyl chloride and 1,1-difluoro-2,2-dimethylethylene was analyzed with the following result: Found: Cl, 8.51%; F, 34.52%. Calculated for a mixture, by total weight, of 16% ethyl chloride and 84% 1,1-difluoro-2,2-dimethylethylene: Cl, 8.79%; F, 34.7%.

Example II 1,1-difluoro-2,2-dimethylethylene alternatively was produced from the olefin, $CF_2ClC(CH_3)=CH_2$, as follows: 25 g. of this olefin, prepared as in Example I, was reacted with excess lithium aluminum hydride (6 g.) in 50 cc. of tetrahydrofuran at 0° C. for one hour. The reaction product was distilled off, freed of residual tetrahydrofuran on a gas washing line, and fractionated to yield 14.1 g. (77% of the theoretical yield) of 1,1-difluoro-2,2-dimethylethylene (B. P. 13° C.). This product, a liquid having a faint hydrocarbon ordor, was analyzed with the following result: Found: C, 52.2%; H, 6.8; F, 41.05%. Calculated: C, 52.2%; H, 6.6%; F, 41.2%.

Example III

The trialkyl phosphite, $(CF_2ClC(CH_3)_2)_3PO_3$, was prepared as an intermediate as follows: 40 g. (0.276 m.) of the carbinol, $CF_2ClC(OH)(CH_3)_2$, prepared as above, and 21.9 g. (0.276 m.) of pyridine, were dissolved in 75 cc. of anhydrous ether at room temperature. Addition of 25.0 g. (0.0922 m.) of phosphorus tribromide to the solution instantly resulted in precipitation of pyridine hydrobromide. After the pyridine hydrobromide was removed by filtration and the ether removed by distillation, the residue was distilled to yield 35.3 g. of the trialkyl phosphite at a temperature of 130° C.–131° C. at 7.5 mm. This product was analyzed with the following result: Found: C, 31.1%; H, 4.0%. Calculated: C, 31.2%; H, 3.94%.

Thereafter, 4 cc. of 1,1-difluoro-2,2-dimethylethylene was prepared by adding 15.0 g. of acid activated zinc dust to 34.0 g. of the trialkyl phosphite with stirring at 190° C. and by fractionating the reaction product (8 cc. of a colorless liquid, B. P. under 25° C.) after freeing it of hydrogen fluoride and other contaminants on a gas washing line.

The infrared absorption spectra of samples of 1,1-difluoro-2,2-dimethylethylene, $CF_2=C(CH_3)_2$, from Examples I, II and III were identical. Each of these spectra was characterized by an absorption band at 1765 cm.$^{-1}$ which indicated the presence of the group, $>C=CF_2$. Oxidation of the olefin with aqueous neutral potassium permanganate at 0° C. yielded a reaction product which was isolated as the 2,4-dinitrophenylhydrazone. This product, identified as acetone by a comparison of its infrared absorption spectrum with that of an authentic sample and by a lack of mixed melting point depression, further proved the structure of the olefin.

Since certain changes may be made in the above composition without departing from the scope of the invention herein involved, it is intended that all matter contained in the above description shall be interpreted as illustrative and not in a limiting sense.

What is claimed is:

1. 1,1-difluoro-2,2-dimethylethylene.
2. The method of preparing 1,1-difluoro-2,2-dimethylethylene which comprises the steps of reacting difluorochloroacetyl chloride with methyl magnesium halide to form difluorochloromethyl dimethyl carbinol, reacting the last-mentioned compound with phosphorus pentachloride to form 1,1-difluoro-1-chloro-2-methyl-propene-2, and hydrogenating the last-mentioned compound to form 1,1-difluoro-2,2-dimethylethylene.

3. A method of preparing 1,1-difluoro-2,2-dimethylethylene, said method comprising catalytically effecting the hydrogenolysis of 1,1-difluoro-1-chloro-2-methyl-propene-2, whereby allylic shifting of the double bond occurs.

References Cited in the file of this patent

UNITED STATES PATENTS

| | | |
|---|---|---|
| 1,979,614 | Goth et al. | Nov. 6, 1934 |
| 2,413,696 | Downing et al. | Jan. 7, 1947 |
| 2,471,525 | Hillyer et al. | May 31, 1949 |
| 2,490,753 | Hill et al. | Dec. 6, 1949 |
| 2,490,764 | Benning et al. | Dec. 13, 1949 |
| 2,549,580 | Dennison et al. | Apr. 17, 1951 |
| 2,666,797 | Husted et al. | Jan. 19, 1954 |
| 2,685,606 | Clark | Aug. 3, 1954 |
| 2,686,207 | Crane et al. | Aug. 10, 1954 |
| 2,700,688 | Crane et al. | Jan. 25, 1955 |
| 2,705,706 | Dittman et al. | Apr. 5, 1955 |

OTHER REFERENCES

Simons: Fuorine Chemistry, vol. I, page 343 (1950).

Pattison: Nature, 174 (No. 4433), pages 737 to 741, March 20, 1952.

McBee: J. Am. Chem. Soc., 74, pages 1387–1390 (March 20, 1952).

Gryszkiewicz-Trochimowski et al.: Bull. Soc. Chim. France 1953, pp. 123–4. Abstracted in Chem. Abstracts, vol. 48 (1954) (page 1238i).